United States Patent
Chen et al.

(10) Patent No.: US 10,072,999 B2
(45) Date of Patent: Sep. 11, 2018

(54) AIR PRESSURE SENSING SYSTEM

(71) Applicant: MERRY ELECTRONICS(SUZHOU) CO., LTD., Jiangsu Province (CN)

(72) Inventors: Jen-Yi Chen, Hsinchu (TW); Chun-Chieh Wang, Hsinchu (TW); Chao-Sen Chang, Hsinchu (TW); Yung-Shiang Chang, Hsinchu (TW)

(73) Assignee: MERRY ELECTRONICS(SUZHOU) CO., LTD., Jiangsu Province (CN)

( * ) Notice: Subject to any disclaimer, the term of this patent is extended or adjusted under 35 U.S.C. 154(b) by 117 days.

(21) Appl. No.: 15/233,964

(22) Filed: Aug. 11, 2016

(65) Prior Publication Data
US 2017/0343441 A1    Nov. 30, 2017

(30) Foreign Application Priority Data
May 27, 2016 (TW) ............... 105116583 A

(51) Int. Cl.
| | |
|---|---|
| *G01L 15/00* | (2006.01) |
| *G01L 13/02* | (2006.01) |
| *G01L 19/00* | (2006.01) |
| *G01L 9/00* | (2006.01) |
| *G01L 19/14* | (2006.01) |

(52) U.S. Cl.
CPC .......... *G01L 13/025* (2013.01); *G01L 9/0054* (2013.01); *G01L 9/0073* (2013.01); *G01L 15/00* (2013.01); *G01L 19/0007* (2013.01); *G01L 19/143* (2013.01); *H05K 999/99* (2013.01)

(58) Field of Classification Search
None
See application file for complete search history.

(56) References Cited

U.S. PATENT DOCUMENTS

| | | | | |
|---|---|---|---|---|
| 5,189,777 | A * | 3/1993 | Guckel | G01L 9/0042 |
| | | | | 29/424 |
| 5,955,659 | A * | 9/1999 | Gupta | G01F 1/28 |
| | | | | 340/632 |
| 6,051,853 | A * | 4/2000 | Shimada | G01L 9/0042 |
| | | | | 257/248 |
| 6,388,299 | B1 * | 5/2002 | Kang | G01L 9/0073 |
| | | | | 257/415 |
| 2008/0123876 | A1 * | 5/2008 | Sato | H04R 19/016 |
| | | | | 381/174 |
| 2009/0235752 | A1 * | 9/2009 | Miyashita | G01L 9/0073 |
| | | | | 73/718 |
| 2014/0053651 | A1 * | 2/2014 | Besling | G01L 9/0016 |
| | | | | 73/702 |

* cited by examiner

*Primary Examiner* — Andre Allen
(74) *Attorney, Agent, or Firm* — JCIPRNET

(57) ABSTRACT

An air pressure sensing system including a first sensing unit and a second sensing unit is provided. The first sensing unit includes a substrate, a diaphragm, and a supporting member. The substrate has a cavity connected with an exterior environment. The diaphragm is movably and deformably disposed at the substrate and suspended in the cavity. An electrostatic force is provided to the substrate and the diaphragm to move the diaphragm, such that a portion of the base, the supporting member and the diaphragm are contacted with each other and a closed space is formed therebetween in the cavity. The closed space and the exterior environment are divided by the diaphragm, and the diaphragm is deformed due to an air pressure difference between the closed space and the exterior environment. An air pressure sensing method is also provided.

15 Claims, 5 Drawing Sheets

AIR PRESSURE SENSING SYSTEM

CROSS-REFERENCE TO RELATED APPLICATIONS

This application claims the priority benefit of Taiwan Patent Application No. 105116583, filed on May 27, 2016. The entirety of the above-mentioned patent application is hereby incorporated by reference herein and made a part of this specification.

BACKGROUND

Technical Field

The disclosure relates to an air pressure sensing system and an air pressure sensing method.

Description of Related Art

Micro pressure sensor manufactured based on micro electro mechanical system (MEMS) technology have been widely used in consumer electronic products, vehicle electronic products, medical electronic products, industrial electronic products, etc. However, usage environments of the aforementioned products are diversified, and regarding an air pressure sensing system of a single type, when it is used in an environment with a larger difference in pressure, which is limited by a sensing range or a sensing accuracy of the air pressure sensing system, the air pressure sensing system cannot accurately sense a pressure corresponding to the environment or is probably failed due to excessive pressure variation.

For example, regarding a pressure sensor with a larger sensing accuracy, it generally obtains an accurate pressure value according to a subtle deformation of a diaphragm structure. However, when the pressure sensor is used in an environment with a larger pressure variation, for example, in an aircraft, since the pressure variation is too large within a short time, it may cause overload deformation of the diaphragm to result in output saturation or even damage of the diaphragm. Therefore, how to achieve a larger pressure sensing range and a higher sensing accuracy of the pressure gauge simultaneously to improve applicability of the pressure gauge becomes an important issue to be studied by related technicians.

SUMMARY

The disclosure is directed to an air pressure sensing system and an air pressure sensing method, based on a composite pressure sensing structure and an intermittent sensing method, accuracy in air pressure sensing is effectively improved and an application range thereof is expanded.

The disclosure provides an air pressure sensing system including a first sensing unit and a second sensing unit. The first sensing unit includes a substrate, a diaphragm, and a supporting member. The substrate has a cavity connected with an exterior environment. The diaphragm is movably and deformably disposed at the substrate and suspended in the cavity. The supporting member is disposed between the substrate and the diaphragm. An electrostatic force is provided between the substrate and the diaphragm to drive the diaphragm, such that a portion of the substrate, the supporting member and the diaphragm are contacted with each other and a closed space is formed in the cavity. The closed space and the exterior environment are divided by the diaphragm, and the diaphragm is deformed due to an air pressure difference between the closed space and the exterior environment.

The disclosure provides an air pressure sensing method, which is adapted to an air pressure sensing system including a first sensing unit and a second sensing unit, where a sensing accuracy of the first sensing unit is greater than a sensing accuracy of the second sensing unit, and a sensing range of the second sensing unit is greater than a sensing range of the first sensing unit. The air pressure sensing method includes following steps. The second sensing unit is activated, and during an operation period of the second sensing unit, the first sensing unit is activated at a first timing, and the first sensing unit is deactivated at a second timing.

In an embodiment of the disclosure, the air pressure sensing system further includes an elastic member connected between the substrate and the diaphragm. The electrostatic force drives the diaphragm to move toward the substrate and deforms the elastic member, such that the cavity forms the closed space. When the electrostatic force is removed, an elastic restoring force of the elastic member drives the diaphragm to return to its original position, and the cavity is connected with the exterior environment.

In an embodiment of the disclosure, the air pressure sensing system further includes a control module electrically connected to the first sensing unit and the second sensing unit. When the closed space is not formed, a signal processing unit of the control module senses an air pressure of the exterior environment through the second sensing unit. When the closed space is formed, the signal processing unit senses an air pressure variation of the exterior environment through deformation of the diaphragm.

In an embodiment of the disclosure, the air pressure sensing system further includes a housing, where the first sensing unit, the second sensing unit and the control module are disposed in the housing. The housing has an opening connected with the exterior environment and internal of the housing.

In an embodiment of the disclosure, the substrate includes a non-conductive region and a conductive region overlapped on the non-conductive region. A driving unit of the control module provides a bias to the conductive region and the diaphragm to produce the electrostatic force between the conductive region and the diaphragm.

In an embodiment of the disclosure, the supporting member and the diaphragm are an integral structure, and the supporting member extends from the diaphragm toward the non-conductive region. The electrostatic force drives the diaphragm to move toward the conductive region, such that the supporting member contacts the non-conductive region to form the closed space.

In an embodiment of the disclosure, the cavity includes at least a first space and a second space. The first space and the second space are connected with each other through at least one gap of the substrate. When the supporting member does not contact the non-conductive region, the first space and the second space are connected with the exterior environment. When the supporting member contacts the non-conductive region, the first space and the second space form the closed space.

In an embodiment of the disclosure, the supporting member and the substrate are an integral structure, and the supporting member extends from the non-conductive region toward the diaphragm. The electrostatic force drives the diaphragm to move toward the conductive region, such that the diaphragm contacts the supporting member to form the closed space.

In an embodiment of the disclosure, the cavity includes at least a third space. When the diaphragm does not contact the supporting member, the third space is connected with the exterior environment. When the diaphragm contacts the supporting member, the third space forms the closed space.

In an embodiment of the disclosure, a sensing accuracy of the first sensing unit is greater than a sensing accuracy of the second sensing unit, and a sensing range of the second sensing unit is greater than a sensing range of the first sensing unit.

In an embodiment of the disclosure, during the operation period of the second sensing unit, the first sensing unit is continually activated and deactivated.

In an embodiment of the disclosure, the first sensing unit includes a substrate, a diaphragm, and a supporting member. The substrate has a cavity connected with an exterior environment. The diaphragm is disposed at the substrate and suspended in the cavity. The supporting member is disposed between the substrate and the diaphragm. The air pressure sensing method further includes following steps. At the first timing, the diaphragm is driven to move toward the substrate, such that the supporting member contact between the diaphragm and the substrate to form a closed space. The closed space and the exterior environment are divided by the diaphragm, and the diaphragm is deformed due to an air pressure difference between the closed space and the exterior environment to obtain an air pressure of the exterior environment.

In an embodiment of the disclosure, the substrate includes a non-conductive region and a conductive region, where the conductive region is overlapped on the non-conductive region, and the conductive region is right aligned to the diaphragm. The supporting member and the diaphragm are an integral structure. The supporting member extends from the diaphragm toward the non-conductive region, and the air pressure sensing method further includes following steps. A bias is provided to the conductive region and the diaphragm to produce an electrostatic force, so as to drive the diaphragm to move toward the conductive region, such that the supporting member contacts the non-conductive region to form the closed space.

In an embodiment of the disclosure, the substrate includes a non-conductive region and a conductive region, where the conductive region is overlapped on the non-conductive region, and the conductive region is right aligned to the diaphragm. The supporting member and the substrate are an integral structure. The supporting member extends from the non-conductive region toward the diaphragm, and the air pressure sensing method further includes following steps. A bias is provided to the conductive region and the diaphragm to produce an electrostatic force, so as to drive the diaphragm to move toward the conductive region, such that the diaphragm contacts the supporting member to form the closed space.

According to the above descriptions, in the embodiments of the disclosure, in the first sensing unit of the air pressure sensing system, the diaphragm is movably disposed at the substrate and suspended in the cavity, and the electrostatic force is adopted to drive the diaphragm, such that a portion of the substrate, the supporting member and the diaphragm are contacted with each other to form the closed space in the cavity. Therefore, through a deformation of the diaphragm caused by an air pressure difference between the closed space and the exterior environment, an accurate air pressure value is obtained. In case of nonuse, the electrostatic force is removed to release the closed space of the aforementioned components, such that the air pressure in internal of the cavity is consistent with air pressure of the exterior environment, and a problem of diaphragm failure due to excessive pressure variation is effectively prevented. In this way, based on the structural design of the first sensing unit, the air pressure sensing system has effects of high accuracy and durability.

Moreover, according to the air pressure sensing method of the disclosure, the second sensing unit with a larger sensing range and a lower accuracy can be used in collaboration with the first sensing unit. Namely, while the second sensing unit is activated, the first sensing unit is activated and deactivated intermittently. In this way, in case of an environment with a larger pressure variation, after the second sensing unit successfully senses the air pressure of the environment, the first sensing unit is activated to obtain an accurate air pressure value through deformation of the diaphragm thereof. The first sensing unit is activated and deactivated intermittently, such that while the accurate air pressure value is obtained, diaphragm failure caused by the environment with excessive pressure variation is avoided. Therefore, by using the first sensing unit and the second sensing unit in collaboration, the air pressure sensing system and the air pressure sensing method may have larger sensing range and obtain accurate air pressure value to achieve better applicability and durability.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
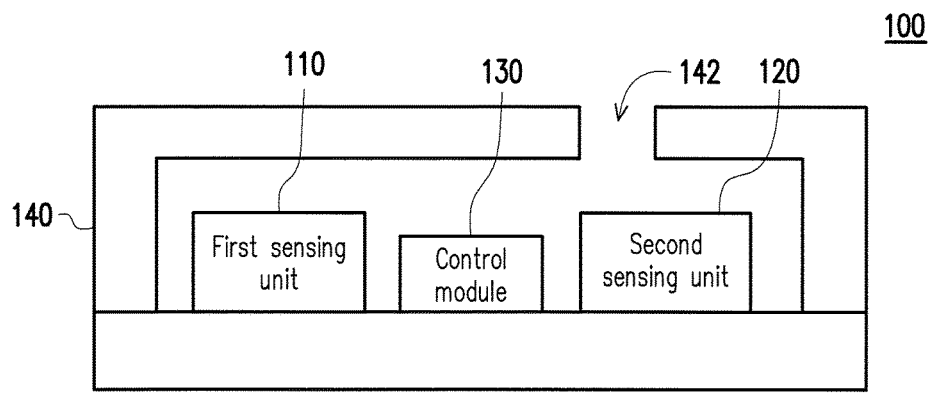
FIG. 1 is a schematic diagram of an air pressure sensing system according to an embodiment of the disclosure.
Figure 2:
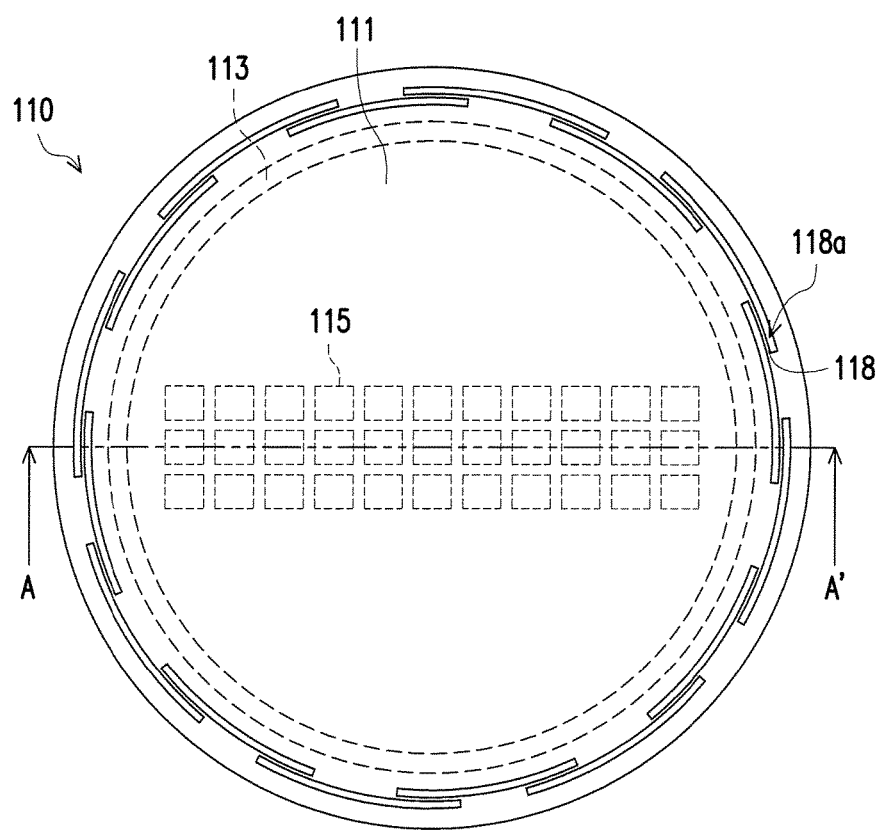
FIG. 2 is a top view of a first sensing unit of the air pressure sensing system of FIG. 1.
Figure 3:
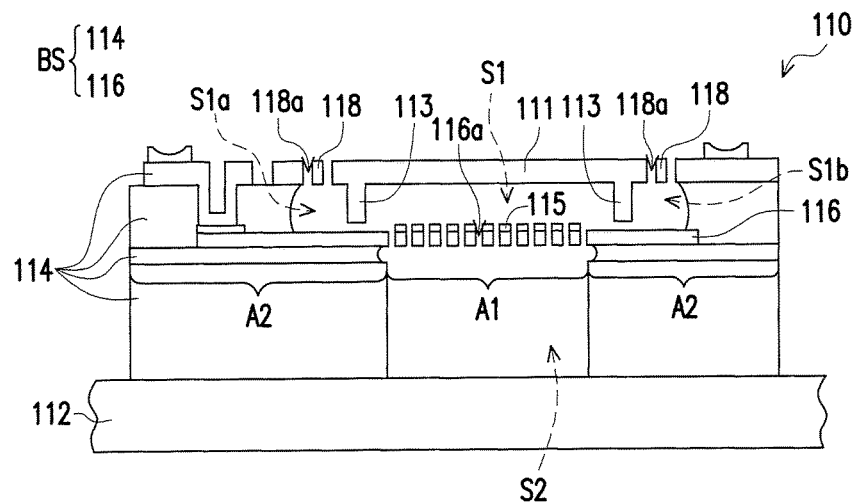
FIG. 3 and FIG. 4 are cross-sectional views of the first sensing unit in different states.
Figure 4:
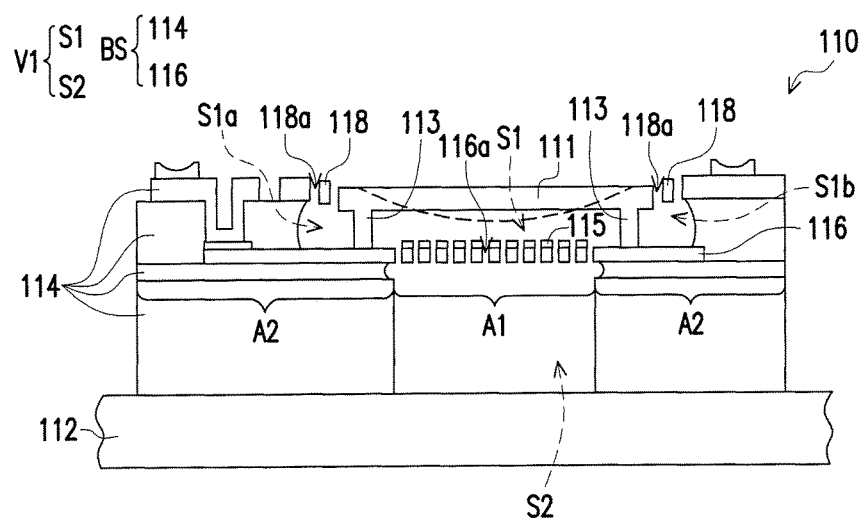

FIG. 1 is a schematic diagram of an air pressure sensing system according to an embodiment of the disclosure. FIG. 2 is a top view of a first sensing unit of the air pressure sensing system of FIG. 1. FIG. 3 and FIG. 4 are cross-sectional views of the first sensing unit in different states viewing along a section line A-A' of FIG. 2. Referring to FIG. 1, in the present embodiment, the air pressure sensing system 100 includes a housing 140 and a first sensing unit 110, a second sensing unit 120 and a control module 130 disposed in the housing 140, where the control module 130 includes an application-specific integrated circuit (ASIC) or other functional module composed of components with the similar function, and the control module 130 is electrically connected with the first sensing unit 110 and the second sensing unit 120. The first sensing unit 110 is, for example, a capacitive pressure sensor manufactured based on micro electro mechanical system (MEMS) technology, and the second sensing unit 120 is, for example, a piezoresistive pressure sensor.

Moreover, in the present embodiment, a sensing accuracy of the first sensing unit 110 is greater than a sensing accuracy of the second sensing unit 120, and a sensing range of the second sensing unit 120 is greater than a sensing range of the first sensing unit 110. Since the first sensing unit 110 may detect a pressure variation with a smaller range and the sensing accuracy thereof is higher, and the second sensing unit 120 may detect an absolute pressure value with a larger range and the sensing accuracy thereof is lower, the air pressure sensing system 100 of the disclosure may balance both of sensing range and sensing accuracy. For example, the first sensing unit 110 may detect a pressure variation of an exterior environment within a smaller range and the sensing accuracy thereof is about 0.01 hPa, and the sensing range of the second sensing unit 120 is 300 hPa to 100 hPa, and the highest sensing accuracy thereof is 1 hPa. Therefore, the control module 130 controls the first sensing unit 110 and the second sensing unit 120 to respectively activate/deactivate the first sensing unit 110 and the second sensing 120, such that the first sensing unit 110 and the second sensing unit 120 may operate in collaboration in air pressure sensing. Moreover, as shown in FIG. 1, the housing 140 has an opening 142 for connecting the exterior environment, and the opening 142 is located adjacent to the second sensing unit 120 and away from the first sensing unit 110, so as to avoid operation failure of the first sensing unit 110 due to influence of external objects when the first sensing unit 110 is located adjacent to the opening 142.

A part of the related components of the embodiment is described below, and operation methods thereof are described later.

Referring to FIG. 2 to FIG. 4, the first sensing unit 110 of the present embodiment is adapted to be disposed on a circuit substrate 112, and the first sensing unit includes a substrate BS, a diaphragm 111, a supporting member 113 and an elastic member 118, where the substrate BS is composed of a plurality of semiconductor layers 114 and 116 stacked on the circuit substrate 112, and forms a cavity. The cavity substantially includes a first space S1, a second space S2 and a space S1$a$ and a space S1$b$ located beside the first space S1 and connected with the exterior environment, as shown in FIG. 3 and FIG. 4. The diaphragm 111 is deformably and movably disposed at the substrate BS and suspended in the cavity. The supporting member 113 is disposed between the substrate BS and the diaphragm 111. The semiconductor layer 116 and the semiconductor layers 114 are disposed on the circuit substrate 112 and located in the cavity, where the semiconductor layer 116 has a plurality of electrodes 115 back-facing the circuit substrate 112 and facing the diaphragm 111, such that the substrate BS forms a conductive region A1 having the electrodes 115 and a non-conductive region A2 without the electrodes 115, and the control module 130 is electrically connected to the electrodes 115 (the conductive region A1). The circuit substrate 112, the semiconductor layers 114 and 116 and the electrodes 115 can all be formed through semiconductor processes, so that at least two of the above components can be formed into an integral structure.

Moreover, the elastic member 118 is connected between the semiconductor layer 114 of the substrate BS and the diaphragm 111, as shown in FIG. 2, the elastic member 118 is substantially a semiconductor layer, which forms a structure having elasticity through a hollow first gap 118$a$. In this way, the diaphragm 111 suspended in the cavity may present a motion state of moving upward or downward as shown in FIG. 3 and FIG. 4 through the elastic member 118. Therefore, when the control module 130 provides a bias to the electrodes 115 at the conductive region A1 and the diaphragm 111, an electrostatic force is generated to drive the diaphragm 111 to move toward the conductive region A1 on the semiconductor layer 116, and thus the elastic member 118 is deformed, as shown in FIG. 4. Comparatively, when the control module 130 does not provide the bias, and the electrostatic force is disappeared, the diaphragm 111 restores its original position due to an elastic force of the elastic member 118, as shown in FIG. 3. Similar to the aforementioned description, the diaphragm 111, the elastic member 118 and the supporting member 113 can also be formed integrally through a semiconductor process.

Referring to FIG. 3 and FIG. 4, it should be noted that the supporting member 113 and the diaphragm 111 are an integral structure, and the supporting member 113 extends from the diaphragm 11 toward the non-conductive region A2 on the semiconductor layer 116. When the electrostatic force drives the diaphragm 111 to move toward the conductive region A1, the supporting member 113 moves along with the diaphragm 111 to contact (lean against) the non-conductive region A2, such that a portion of the substrate BS, the supporting member 113 and the diaphragm 111 form a closed space V1.

In detail, the first space S1 of the present embodiment is located between the diaphragm 111 and the conductive region A1, and the second space S2 is located between the conductive region A1 and the circuit substrate 112 (and a portion of the semiconductor layer 114), and the first space S1 and the second space S2 are connected with each other through at least one second gap 116$a$ (in the present embodiment, a plurality of second gaps is illustrated, though the disclosure is not limited thereto) of the substrate BS.

As shown in FIG. 3, when the electrostatic force is not formed, i.e. when the supporting member 113 does not contact the non-conductive region A2, besides that the first space S and the second space S2 are connected with each other, they are further connected with the exterior environment through the spaces S1$a$ and S1$b$ and the first gap 118$a$ of the elastic member 118, so that the space included in the cavity is substantially connected with the exterior environment and maintains a same air pressure with the exterior environment. Then, as shown in FIG. 4, when the diaphragm 111 moves toward the conductive region A1 due to the electrostatic force to contact the supporting member 113 to the non-conductive region A2, the first space S1 and the second space S2 form the closed space V1. Therefore, the diaphragm 111 is deformed due to an air pressure difference between the closed space V1 and the exterior environment, as shown by dash lines of FIG. 4, so as to obtain a present air pressure value.

Figure 5:
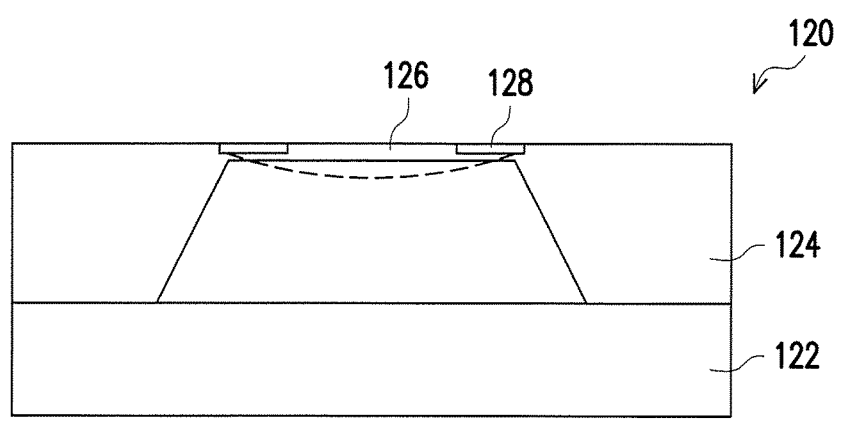
FIG. 5 is a cross-sectional view of a second sensing unit of FIG. 1.
Figure 6:
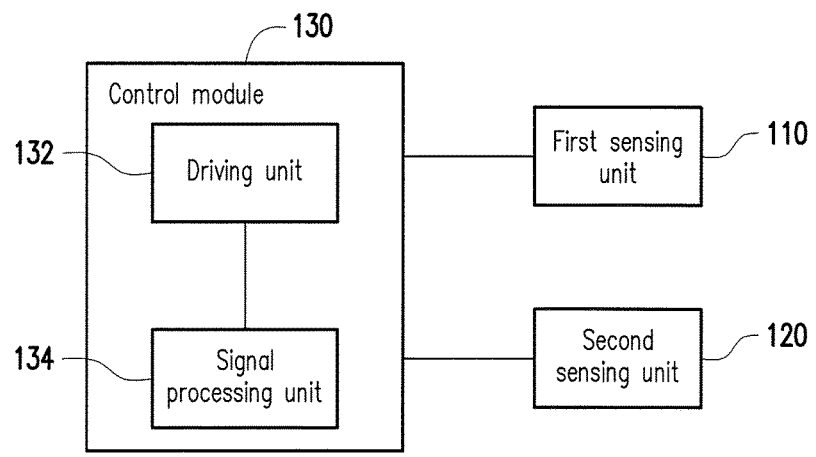
FIG. 6 is a block diagram of related components of an air pressure sensing system.
Figure 7:
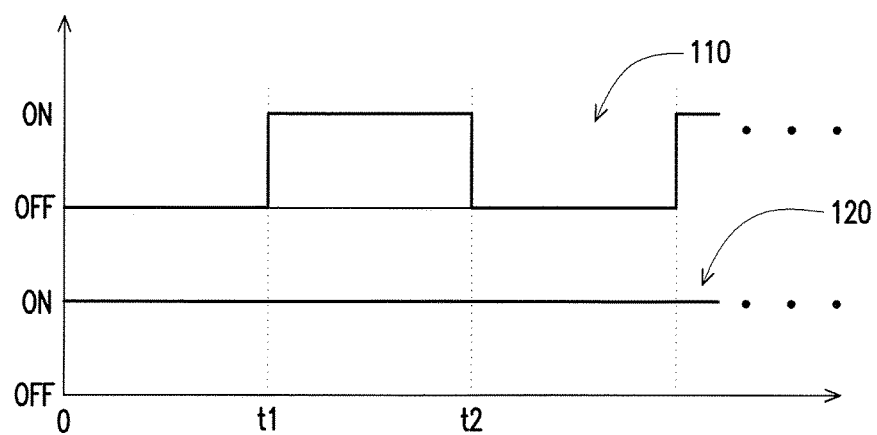
FIG. 7 is an operation-timing diagram related to a sensing unit according to an embodiment of the disclosure.

FIG. 5 is a cross-sectional view of the second sensing unit of FIG. 1. FIG. 6 is a block diagram of related components of an air pressure sensing system to describe an electrical connection relationship between the components. FIG. 7 is an operation-timing diagram related to a sensing unit according to an embodiment of the disclosure. Referring to FIG. 5, the second sensing unit 120 of the present embodiment includes a circuit substrate 122, a semiconductor layer 124, a diaphragm 126 and a pressure sensing unit 128 disposed on the diaphragm 126, where the circuit substrate 122 and the semiconductor layer 124 are similar to the structure of the aforementioned embodiment (wherein the circuit substrate 122, the semiconductor layer 124, and the diaphragm 126 form a cavity that the diaphragm 126 is suspended therein, such that the diaphragm 126 could be deformed toward the cavity, as the dashed lines shown in FIG. 5), and the diaphragm 126 is suitable for a larger pressure sensing range, and the pressure sensing unit 128 disposed thereon is used for sensing a deformation amount (shown by dash lines of FIG. 5) of the diaphragm 126 caused by air pressure, so as to obtain a present air pressure value.

Referring to FIG. 6 and FIG. 7, the control module 130 substantially uses a driving unit 132 to respectively activate/deactivate the first sensing unit 110 and the second sensing unit 120, and meanwhile provides a bias to the first sensing unit 110 to control upper and lower moving positions of the diaphragm 111 thereof, so as to form or release the closed space V1. Moreover, after the first sensing unit 110 and the second sensing unit 120 shown in FIG. 3 to FIG. 5 are disposed in the housing 140 as shown in FIG. 1, the control module 130 may control the first sensing unit 110 and the second sensing unit 120, where a signal processing unit 134 of the control module 130 is used for respectively processing a capacitance or resistance variation of the first sensing unit 110 and the second sensing unit 120 generated due to deformation of the respective diaphragms 110 and 126, so as to determine the present air pressure value.

The operation-timing diagram of FIG. 7 is referred for further description. First, in an initial step, the second sensing unit 120 is activated to directly obtain a preliminary air pressure value. As described above, the second sensing unit 120 is adapted to the larger pressure sensing range, so that the sensing is performed without being influenced, and now the first sensing unit 110 is in a turn off state as shown in FIG. 3, and pressures inside and outside the diaphragm 111 (i.e. in the cavity and the exterior environment) are the same, so as to avoid damaging the diaphragm 111 of the first sensing unit 110 due to the pressure variation. Then, during the operation period of the second sensing unit 120, the first sensing unit 110 is activated at a first timing t1. Therefore, as shown in FIG. 4, the closed space V1 is formed in the first sensing unit 110, and the closed space V1 and the exterior environment are divided by the diaphragm 111, so that the diaphragm 111 is deformed due to the air pressure difference, and the first sensing unit 110 obtains the present air pressure value. As described above, the sensing accuracy of the first sensing unit 110 is greater than the sensing accuracy of the second sensing unit 120, so that the air pressure sensing system 100 may further obtain the accurate air pressure value through the first sensing unit 110 under the situation that the second sensing unit 120 has obtained the preliminary air pressure value.

Then, at a second timing t2 (wherein the first timing t1 and the second timing t2 are not overlapped), the first sensing unit 110 is deactivated to restore the first sensing unit 110 from a state shown in FIG. 4 to a state shown in FIG. 3. Now, the closed space V1 is disappeared, and the pressures inside and outside the cavity are again balanced to achieve a reset effect. Thereafter, the first sensing unit 110 is again activated at a different timing, and activation and deactivation of the first sensing unit 110 are repeatedly performed. In this way, during the operation period of the second sensing unit 120, the first sensing unit 110 is intermittently activated and deactivated, and the air pressure sensing system 100 becomes a sensing system with both of the high sensing range and the high sensing accuracy, so as to avoid output saturation or even failure of the first sensing unit 110 due to excessive pressure variation, and then the first sensing unit 110 is going to be activated and deactivated continually. Moreover, the aforementioned timings are not limited by the disclosure, which can be suitably changed according to the product applying the air pressure sensing system and an actual usage environment.

Figure 8:
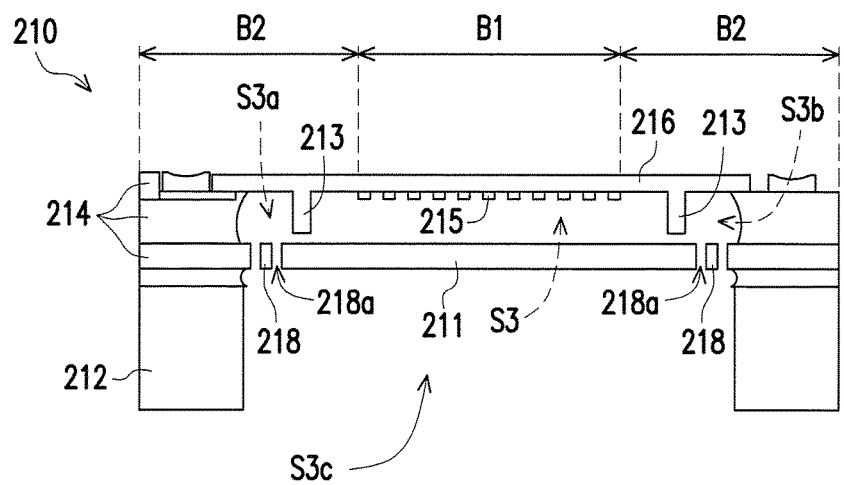
FIG. 8 is a cross-sectional view of a first sensing unit according to another embodiment of the disclosure.
Figure 9:
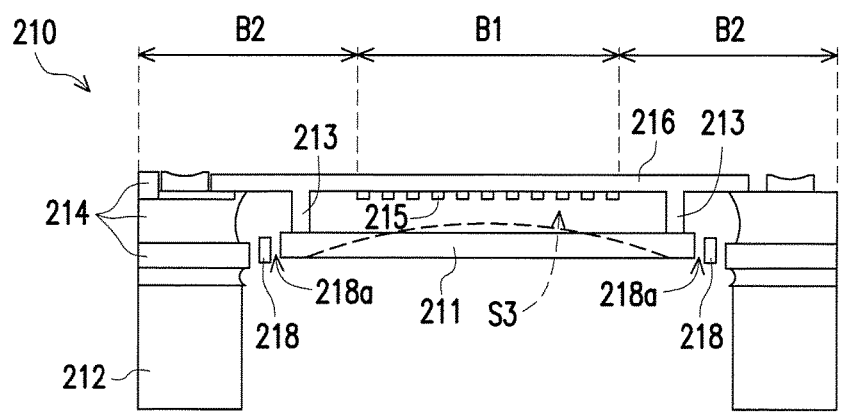
FIG. 9 is a cross-sectional view of the first sensing unit of FIG. 8 in another state.

FIG. 8 is a cross-sectional view of a first sensing unit according to another embodiment of the disclosure. FIG. 9 is a cross-sectional view of the first sensing unit of FIG. 8 in another state. Referring to FIG. 8 and FIG. 9, different to the aforementioned embodiment, in the first sensing unit 210 of the present embodiment, a supporting member 213 and a semiconductor layer 216 of the substrate are an integral structure.

Further, the first sensing unit 210 is adapted to be disposed on a circuit substrate 212, and the first sensing unit 210 includes the substrate (including a plurality of semiconductor layers 214 and 216), a diaphragm 211 and an elastic member 218. Similar to the aforementioned embodiment, the substrate has a cavity, and the diaphragm 211 is connected with the semiconductor layer 214 through the elastic member 218, and is movably suspended in the cavity. A plurality of electrodes 215 directly facing the diaphragm 211 is disposed on the semiconductor layer 216, and the control module 130 (shown in FIG. 1 and FIG. 6, and is omitted in the present embodiment) is electrically connected with the electrodes 215 to provide a bias thereto, and a conductive region B1 and a non-conductive region B2 are accordingly formed. Moreover, the supporting member 213 extends from the non-conductive region B2 of the semiconductor layer 216 toward the diaphragm 211, and in the present embodiment, the cavity is substantially an open space, i.e. the cavity of the present embodiment substantially includes a third space S3 located between the conductive region B1 of the semiconductor layer 216 and the diaphragm 211, spaces S3a and S3b located beside the third space S3 (between the non-conductive region B2 and the diaphragm 211, the elastic member 218), and a space S3c between the diaphragm 211 and the circuit substrate 212.

In this way, when the first sensing unit 210 is not activated, the third space S3 is substantially connected with the space S3c and the exterior environment through the spaces S3a, S3b and a first gap 218a of the elastic member 218, such that the air pressures of the above spaces and the exterior environment are balanced. Moreover, when the control module 130 provides the bias to the electrodes 215 at the conductive region B1 and the diaphragm 211, the formed electrostatic force drives the diaphragm 211 to move toward the conductive region B1, such that the diaphragm 211 contacts the supporting member 213 located at the non-conductive region B2, and the third space S3 forms a closed space. In this way, the air pressure difference between the exterior environment and the closed space (the third space S3) is revealed through deformation of the diaphragm 211 (shown by dash lines of FIG. 9), and the first sensing unit 210 may obtain the present air pressure value to achieve the same effect as that of the aforementioned embodiment.

In summary, in the embodiments of the disclosure, the air pressure sensing device applies the first sensing unit with higher sensing accuracy and the second sensing unit with larger sensing range, and in the first sensing unit, by applying or not applying the electrostatic force, the closed space can be formed or released between the diaphragm, the supporting member and a portion of the substrate, and a purpose of intermittently activating and deactivating the first sensing unit is achieved through the control method, such that the first sensing unit may provide an accurate air pressure value, and meanwhile avoid the problem of output saturation or failure caused by excessive pressure variation, and the air pressure sensing device and the air pressure sensing method can be integrated to achieve a sensing effect with both of high sensing range and high accuracy.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An air pressure sensing system, comprising a first sensing unit and a second sensing unit, wherein the first sensing unit comprises:
   a substrate, having a cavity connected with an exterior environment;
   a diaphragm, movably and deformably disposed at the substrate and suspended in the cavity; and
   a supporting member, disposed between the substrate and the diaphragm, wherein an electrostatic force is provided between the substrate and the diaphragm to drive the diaphragm, such that a portion of the substrate, the supporting member and the diaphragm are contacted with each other and a closed space is formed in the cavity, the exterior environment and the closed space are divided by the diaphragm, and the diaphragm is deformed due to an air pressure difference between the exterior environment and the closed space.

2. The air pressure sensing system as claimed in claim 1, further comprising:
   an elastic member, connected between the substrate and the diaphragm, wherein the electrostatic force drives the diaphragm to move toward the substrate and deforms the elastic member, such that the cavity forms the closed space, and when the electrostatic force is removed, an elastic restoring force of the elastic member drives the diaphragm to return to its original position, and the cavity is connected with the exterior environment.

3. The air pressure sensing system as claimed in claim 1, further comprising:
   a control module, electrically connected to the first sensing unit and the second sensing unit, wherein when the closed space is not formed, a signal processing unit of the control module senses an air pressure of the exterior environment through the second sensing unit, and when the closed space is formed, the signal processing unit senses an air pressure variation of the exterior environment through deformation of the diaphragm.

4. The air pressure sensing system as claimed in claim 1, further comprising:
   a housing, wherein the first sensing unit, the second sensing unit and the control module are disposed in the housing, and the housing has an opening connected with the exterior environment and internal of the housing.

5. The air pressure sensing system as claimed in claim 3, wherein the substrate comprises:
   a non-conductive region; and
   a conductive region, overlapped on the non-conductive region, wherein a driving unit of the control module provides a bias to the conductive region and the diaphragm to produce the electrostatic force between the conductive region and the diaphragm.

6. The air pressure sensing system as claimed in claim 5, wherein the supporting member and the diaphragm are an integral structure, and the supporting member extends from the diaphragm toward the non-conductive region, the electrostatic force drives the diaphragm to move toward the conductive region, such that the supporting member contacts the non-conductive region to form the closed space.

7. The air pressure sensing system as claimed in claim 6, wherein the cavity comprises at least a first space and at least a second space, the first space and the second space are connected with each other through at least one gap of the substrate, when the supporting member does not contact the non-conductive region, the first space and the second space are connected with the exterior environment, and when the supporting member contacts the non-conductive region, the first space and the second space form the closed space.

8. The air pressure sensing system as claimed in claim 6, wherein the supporting member and the substrate are an integral structure, and the supporting member extends from the non-conductive region toward the diaphragm, and the electrostatic force drives the diaphragm to move toward the conductive region, such that the diaphragm contacts the supporting member to form the closed space.

9. The air pressure sensing system as claimed in claim 8, wherein the cavity comprises at least a third space, when the diaphragm does not contact the supporting member, the third space is connected with the exterior environment, and when the diaphragm contacts the supporting member, the third space forms the closed space.

10. The air pressure sensing system as claimed in claim 1, wherein a sensing accuracy of the first sensing unit is greater than a sensing accuracy of the second sensing unit, and a sensing range of the second sensing unit is greater than a sensing range of the first sensing unit.

11. An air pressure sensing system, comprising:
    a control module, electrically connected to a first sensing unit and a second sensing unit, wherein a sensing accuracy of the first sensing unit is greater than a sensing accuracy of the second sensing unit, and a sensing range of the second sensing unit is greater than a sensing range of the first sensing unit,
    wherein the control module activates the first sensing unit at a first timing and deactivates the first sensing unit at a second timing during an operation period of the second sensing unit.

12. The air pressure sensing system as claimed in claim 11, wherein during the operation period of the second sensing unit, the first sensing unit is continually activated and deactivated by the control module.

13. The air pressure sensing system as claimed in claim 11, wherein the first sensing unit comprises a substrate, a diaphragm, and a supporting member,
    wherein the control module drives the diaphragm to move toward the substrate at the first timing, such that the supporting member contact between the diaphragm and the substrate to form a closed space.

14. The air pressure sensing system as claimed in claim 13, wherein the substrate comprises a non-conductive region and a conductive region, the conductive region is right aligned to the diaphragm, the supporting member and the diaphragm are an integral structure, the supporting member extends from the diaphragm toward the non-conductive region, wherein the control module provides a bias to the conductive region and the diaphragm to produce an electrostatic force, so as to drive the diaphragm to move toward the conductive region, such that the supporting member contacts the non-conductive region to form the closed space.

15. The air pressure sensing system as claimed in claim 13, wherein the substrate comprises a non-conductive region and a conductive region, the conductive region is right aligned to the diaphragm, the supporting member and the substrate are an integral structure, the supporting member extends from the non-conductive region toward the diaphragm, wherein the control module provides a bias to the conductive region and the diaphragm to produce an electrostatic force, so as to drive the diaphragm to move toward the conductive region, such that the diaphragm contacts the supporting member to form the closed space.

\* \* \* \* \*